3,243,347
INSTANTLY ASSIMILABLE VITAMIN PRODUCT
Paul Kracauer, New York, N.Y., assignor to Packaged Products Corporation, Brooklyn, N.Y., a corporation of New York
No Drawing. Filed July 18, 1962, Ser. No. 210,833
4 Claims. (Cl. 167—81)

The present invention relates to an instantly assimilable vitamin product, and more particularly to a dry vitamin product in granular form which can be immediately dissolved in liquids and taken in such form without any of the bad taste or after taste of the normal vitamins and minerals.

Most vitamin products are in the form of tablets or capsules. Such tablets or capsules when taken orally require about one to two hours before they are absorbed by the body. However, a more important disadvantage of such products is that the same cannot be taken by either very young people or very old people for the reason that the young and the old find it difficult to swallow tablets and capsules.

For this reason many vitamin preparations have been made in the form of liquids containing various flavorings for the purpose of "covering" the taste of the vitamins and minerals. These preparations suffer from the disadvantage that not everyone likes the particular taste used to cover up the vitamin and mineral taste, and, moreover, the cover up can only be effective with respect to certain vitamins and minerals and therefore such preparations often omit sufficient amounts of bad tasting vitamins and minerals such as vitamin B–1, vitamin D, and iron.

It is therefore a primary object of the present invention to provide a vitamin preparation in solid form which can be instantly dissolved in beverages, such as milk, fruit juices, and the like, which do not have bad taste, and which can be taken by anyone in this form.

It is another object of the present invention to provide a method of producing the vitamin product of the invention.

It is yet another object of the present invention to provide a granular vitamin product which dissolves instantly in liquids and which has no bad taste.

Other objects and advantages of the present invention will be apparent from a further reading of the specification and of the appended claims.

With the above and other objects in view, the present invention mainly comprises a dry vitamin product consisting essentially of vitamins and minerals absorbed by non-fat, dry milk solids. This product in granular form dissolves immediately in beverages such as milk, juices, tea, coffee, and the like, and in this form is immediately absorbed by the person taking the same. Most important, the product of the present invention does not adversely affect the taste of the liquid in which it is dissolved, although there is no satisfactory explanation as yet as to why the non-fat dry milk solids and the vitamin and mineral combination of the present invention is odorless and tasteless and does not leave any after taste.

Likewise, there is no satisfactory explanation at the present time as to why the composition of the present invention immediately dissolves in liquids. The fact is that the composition does have these advantages, and consequently constitute a considerable advance in the art of vitamin administration.

The composition of the present invention is prepared simply by mixing the dry milk solids with the vitamins and minerals which are chosen in a tumbler or a Blendor without the presence of water or heat. The dry milk solids will absorb the vitamins and minerals and result in the granular product of the present invention.

In accordance with a preferred embodiment of the present invention the method which is used to mix the vitamins and minerals with about 20% of the chosen amount of non-fat dry milk solids in finely powdered form, and then to mix this mixture with the remaining 80% of coarse non-fat dry milk solids. The entire mixture is then tumble-mixed and the coarse granules absorb the fine powder and the vitamins and minerals to result in a highly effective form of the composition of the present invention.

In accordance with yet another embodiment of the present invention ordinary granules of non-fat dry milk solids, such as those obtained commercially from any of the normal commercial sources, are mixed with about 0.1–0.2% by weight of propylene glycol. The propylene glycol has the effect of making the granules larger and harder, and thereby improving the ability of the granules to absorb the finely powdered non-fat dry milk solids and the vitamins and minerals. In addition, this property of the propylene glycol to increase the size and hardness of granules of non-fat dry milk solids can be used for other purposes than simply the use of such granular non-fat dry milk solids in the preparation of the vitamin product of the present invention.

The following example is given to further illustrate the present invention. The scope of the invention is not, however, meant to be limited to the specific details of the example.

200 g. of fine-powdered, non-fat, dry milk solids are mixed with the following:

| | |
|---|---|
| Vitamin A (as palmitate), USP units | 4,000,000 |
| Vitamin B (activated ergosterol), USP units | 400,000 |
| Vitamin E (alpha-tocopheryl acetate), International units (1g.) | 1,000 |
| Vitamin C (sodium ascorbate), mg. | 60,000 |
| Vitamin B–1 (thiamin mononitrate), mg. | 2,000 |
| Vitamin B–2 (riboflavin), mg. | 2,400 |
| Vitamin B–6 (pyridoxin HCl), mg. | 500 |
| Vitamin B–12, mg. | 1 |
| Niacinamide, mg. | 15,000 |
| Calcium pantothenate, mg. | 200 |
| Iron (from phosphate), mg. | 20,000 |
| Iodine (from potassium iodide), mg. | 200 |
| Calcium (from phosphate), mg. | 8,000 |
| Phosphorus (from calcium phosphate), mg. | 4,000 |
| Copper (from copper sulfate), mg. | 100 |

After mixing the dry mixture in a Blendor the same is then tumbled with 800 g. of coarse, non-fat dry milk solid granules which have first been treated with 0.1% by weight of propylene glycol to increase the size and hardness thereof.

After the mixture is tumble-mixed until uniform the same is divided in 1000 equal amounts and placed in small envelopes.

The envelope when emptied into milk, or any other beverage will result in immediate dissolution and the vitamins can be taken in this form without any odor, taste, or after taste. The vitamins taken in this form are immediately absorbed by the body.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A dry, granular vitamin and mineral preparation adapted to be dissolved in beverages without bad taste, comprising per unit dose about 0.5–3 grams of non-fat dry milk solid granules made larger, harder and more absorbent by the addition of between about 0.1 and 0.2% by weight of propylene glycol, said granules having adsorbed therein dry vitamins and minerals.

2. A dry, granular vitamin and mineral preparation, comprising granules of non-fat dry milk solids made larger, harder and more absorbent by the addition of between about 0.1 and 0.2% by weight of propylene glycol and having absorbed therein dry vitamins and minerals.

3. The method of producing a dry, granular vitamin and mineral preparation, which comprises mixing granules of non-fat dry milk solids with about 0.1–0.2% by weight of propylene glycol so as to make the granules larger, harder and more absorbent; and mixing said larger, harder and more absorbent granules with dry vitamins and minerals so as to cause absorption of said vitamins and minerals by the granules of non-fat dry milk solids, thereby forming a dry granular vitamin-mineral preparation which can be dissolved in beverages without affecting the taste of the beverages.

4. Method of producing a dry, granular vitamin preparation comprising a pre-determined amount of vitamins and minerals absorbed by a pre-determined amount of non-fat dry milk solids, which comprises mixing said pre-determined amount of dry vitamins and minerals with approximately 20% of granules of said pre-determined amount of non-fat dry milk solids which were made larger, harder and more absorbent by the addition of between about 0.1 and 0.2% by weight of propylene glycol so as to cause absorption of said vitamins and minerals by said granules of non-fat dry milk solids; and further mixing the thus formed mixture with the remaining 80% of granules of said pre-determined amount of said non-fat dry milk solids which were made larger, harder and more absorbent by the addition of between about 0.1 and 0.2% by weight of propylene glycol, thereby forming a uniform composition comprising dry, granular non-fat milk solids which were made larger, harder and more absorbent by the addition of between about 0.1 and 0.2% by weight of propylene glycol and which contain absorbed therein vitamins and minerals.

References Cited by the Examiner

UNITED STATES PATENTS

| | | | |
|---|---|---|---|
| 2,236,517 | 4/1941 | Cahn | 99—11 |
| 2,758,923 | 8/1956 | Wakely | 167—81 |
| 2,933,392 | 4/1960 | Iacono | 167—81 |
| 3,072,533 | 1/1963 | Johnson | 167—81 |

OTHER REFERENCES

Husa: Pharmaceutical Dispensing, 1947, Husa Brothers, Iowa City, Iowa, pp. 12–14.

JULIAN S. LEVITT, *Primary Examiner.*

FRANK CACCIAPAGLIA, JR., LEWIS GOTTS,
*Examiners.*